US008091234B2

(12) United States Patent
Ibe et al.

(10) Patent No.: US 8,091,234 B2
(45) Date of Patent: Jan. 10, 2012

(54) MANUFACTURING METHOD FOR LIQUID DISCHARGE HEAD SUBSTRATE

(75) Inventors: Satoshi Ibe, Yokohama (JP); Hirokazu Komuro, Yokohama (JP); Takuya Hatsui, Tokyo (JP); Kazuhiro Asai, Kawasaki (JP); Shimpei Otaka, Yokohama (JP); Hiroto Komiyama, Tokyo (JP); Keisuke Kishimoto, Yokohoma (JP)

(73) Assignee: Canon Kabushiki Kaisha, Tokyo (JP)

( * ) Notice: Subject to any disclaimer, the term of this patent is extended or adjusted under 35 U.S.C. 154(b) by 790 days.

(21) Appl. No.: 12/203,681

(22) Filed: Sep. 3, 2008

(65) Prior Publication Data

US 2009/0065473 A1 Mar. 12, 2009

(30) Foreign Application Priority Data

Sep. 6, 2007 (JP) ................................ 2007-231353

(51) Int. Cl.
*B21D 53/76* (2006.01)
*B23P 17/00* (2006.01)

(52) U.S. Cl. ........................................ 29/890.1; 216/27

(58) Field of Classification Search ........................ None
See application file for complete search history.

(56) References Cited

U.S. PATENT DOCUMENTS

| | | | |
|---|---|---|---|
| 6,143,190 A | 11/2000 | Yagi et al. | |
| 6,805,432 B1 | 10/2004 | Milligan et al. | |
| 7,207,109 B2 * | 4/2007 | Tokunaga et al. | 29/890.1 |
| 7,250,113 B2 | 7/2007 | Komuro et al. | |
| 7,503,114 B2 * | 3/2009 | Tokunaga et al. | 29/890.1 |
| 7,727,411 B2 * | 6/2010 | Yamamuro et al. | 216/27 |
| 2001/0041337 A1 * | 11/2001 | Szyf et al. | 435/6 |
| 2008/0076197 A1 | 3/2008 | Komuro et al. | |
| 2008/0094454 A1 | 4/2008 | Koyama et al. | |
| 2009/0065472 A1 | 3/2009 | Asai et al. | |
| 2009/0065476 A1 | 3/2009 | Komiyama et al. | |
| 2009/0065481 A1 | 3/2009 | Kishimoto et al. | |
| 2009/0065482 A1 | 3/2009 | Komiyama et al. | |

* cited by examiner

*Primary Examiner* — Duy Deo
(74) *Attorney, Agent, or Firm* — Fitzpatrick, Cella, Harper & Scinto

(57) ABSTRACT

A manufacturing method, for a liquid discharge head that includes a silicon substrate in which a supply port is formed for supplying a liquid, includes the steps of providing the silicon substrate, a mask layer provided with an opening that corresponds to the supply port being provided on one face of the silicon substrate; forming a groove in the silicon substrate along the shape of the opening in the mask layer; removing, via sandblasting, silicon of the silicon substrate inward of the groove in the silicon substrate; and performing, from the one face, anisotropic etching of the silicon substrate that has been sandblasted, and forming the supply port.

7 Claims, 4 Drawing Sheets

MANUFACTURING METHOD FOR LIQUID DISCHARGE HEAD SUBSTRATE

BACKGROUND OF THE INVENTION

1. Field of the Invention

The present invention relates to a method for manufacturing a liquid discharge head substrate.

2. Description of the Related Art

An ink jet recording head that has been adapted and used as a well known liquid discharge head has an arrangement much like that illustrated in FIG. 3. As shown in FIG. 3, a through hole is opened from the reverse to the obverse face of a silicon substrate 101 where heaters 102 are mounted on the obverse face, and serves as an ink supply port 113, via which ink is supplied from the reverse to the obverse side of the silicon substrate 101.

A method for manufacturing such an ink jet recording head is disclosed in U.S. Pat. No. 6,143,190. The use of this manufacturing method is proposed to prevent discrepancies in the opening diameter of an ink supply port 113, a through hole, and includes the following processes: 1) a process for forming on the obverse face of a silicon substrate, at a location whereat an ink supply port is to be formed, a sacrificial layer through which selective etching of substrate material may be performed; 2) a process for forming a passivation layer having a moderate etching resistance, on the silicon substrate, to cover the sacrificial layer; 3) a process for forming an etching mask layer, on the reverse face of the silicon substrate, in which an opening corresponding to the sacrificial layer is formed; 4) a process for performing crystal anisotropic etching of the silicon substrate until the sacrificial layer at the opening is exposed; 5) a process for removing the sacrificial layer by etching the portion whereat the sacrificial layer is exposed as a result of the anisotropic etching of the silicon substrate; and 6) a process for removing part of the passivation layer and forming an ink supply port.

Another manufacturing method is disclosed in U.S. Pat. No. 6,805,432. According to this method, dry etching is performed using a mask mounted on the reverse of a silicon substrate, and then, crystal anisotropic etching is performed using the same mask. Thus, an ink jet recording head can be obtained.

Recently, requests for a downsized ink jet recording head have greatly increased, especially is this so for a color ink jet head for which multiple ink supply ports are formed in a single substrate.

However, since the method disclosed in U.S. Pat. No. 6,143,190 employs anisotropic wet etching for the formation of an ink supply port, a long etching period is required. In addition, according to this method, since the opening size is determined in accordance with the {111} plane along the silicon crystal axis, the opening size of the ink supply port on the reverse of the silicon substrate is increased, and downsizing of the head is therefore difficult. According to the method disclosed in U.S. Pat. No. 6,805,432, since one mask is employed for both dry etching and wet etching, the opening width of the ink supply port on the reverse of the silicon substrate is determined in accordance with the width of the mask on the reverse side of the silicon substrate and the amount of material removed by dry etching. Therefore, when the width of the ink supply port is to be narrowed for downsizing, a small opening must be formed in the mask, the anisotropic wet etching period must be shortened and the amount of material removed by side etching in the opening face must be reduced. To do this, the amount of material removed by dry etching must be increased; however, since an extended period is required for dry etching, in such a case, deterioration of the production efficiency may occur.

SUMMARY OF THE INVENTION

Therefore, one objective of the present invention is to provide a method for stably and efficiently manufacturing an ink jet recording head substrate wherein widening of a supply port is prevented.

According to one aspect of the present invention, a manufacturing method, for a liquid discharge head that includes a silicon substrate in which a supply port is formed for supplying a liquid, comprises the steps of: providing the silicon substrate, a mask layer provided with an opening that corresponds to the supply port being provided on one face of the silicon substrate; forming a groove in the silicon substrate along the shape of the opening in the mask layer; removing, using sandblasting, silicon of the silicon substrate from the inner wall of the groove in the silicon substrate; and performing, from the one face, anisotropic etching of the silicon substrate that has been sandblasted, and forming the supply port.

According to the present invention, the ink jet recording head substrate, wherein widening of the supply port is prevented, can be stably and efficiently manufactured.

Further features of the present invention will become apparent from the following description of exemplary embodiments with reference to the attached drawings.

DESCRIPTION OF THE EMBODIMENTS

Figure 1:
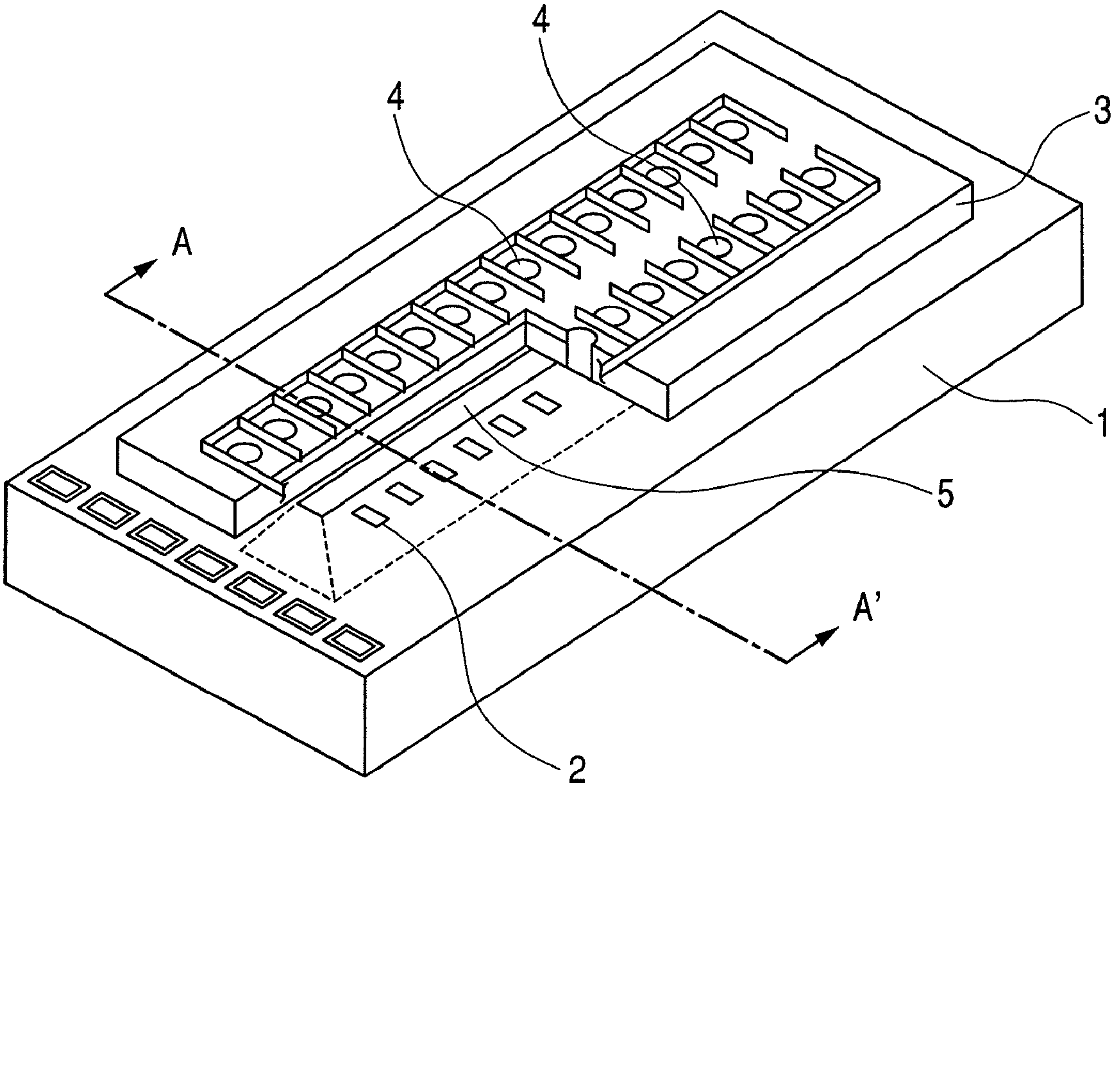
FIG. 1 is a schematic, partly cutaway perspective view of an example ink jet recording head substrate according to the present invention.

One embodiment of the present invention will now be described while referring to accompanying drawings. In the following description, the same reference numbers are employed in the drawings for arrangements having the same function, and no further description will be given. Furthermore, in the following description, an ink jet recording head substrate that can be mounted in an ink jet recording head is employed as an example liquid discharge head substrate used for a liquid discharge head. However, the liquid discharge head substrate of the present invention is not limited to such a use, and can also be applied for a DNA chip and a liquid discharge head used for manufacturing display devices.

As will be described below, according to this invention, a method for manufacturing an ink jet recording head substrate is characterized by the processing performed to form an ink supply port.

First, a groove formation process is performed using a laser by superimposing non-perforating holes. Then, a mechanical method, such as sandblasting, is used to remove silicon from the inner wall of the groove. The removal of silicon should be performed only to a depth shallower than that of the groove, so as not to pass through the substrate. Following this, anisotropic wet etching is performed to obtain an ink supply port.

Since silicon is removed from the inner wall of the previously formed groove by sandblasting, the anisotropic wet etching period can be shortened, and productivity improved. Further, since a smaller reverse opening can be provided for the ink supply port than when the manufacturing method employed uses only anisotropic wet etching, a compact ink jet recording head substrate can be made.

In addition, since according to the manufacturing method of the invention the groove is previously formed in an area from which silicon is to be removed using sandblasting, even if a crack should occur during this process, growth of the crack can be prevented by the groove, and removal of the silicon can be stably performed.

This processing will be described in detail while referring to drawings relevant to the following embodiment.

FIG. 1 is a partly cutaway perspective view of an ink jet recording head substrate according to the embodiment.

This ink jet recording head substrate includes: a silicon substrate 1 whereon discharge energy generation elements 2, for discharging ink, are arranged in two arrays, at predetermined pitches.

A polyether amide resin (not shown) is applied to the silicon substrate 1 and serves as an adhesive layer between the silicon substrate 1 and a photosensitive coating resin, flow passageway formation member 3, in which ink flow passageways and ink discharge ports 4 are formed. The ink discharge ports 4 pass through side walls of the flow passageways and open above the discharge energy generation elements 2. Thus, the ink flow passageways in the flow passageway formation member 3 connect the ink discharge ports 4 to an ink supply port 5, formed by anisotropic etching of silicon, between the two arrays of discharge energy generation elements 2.

When recording is performed using this arrangement, ink fed to the ink jet recording head is supplied, via the ink supply port 5, to the ink flow passageways, wherein pressure produced by the discharge energy generation elements 2 is applied to the ink to discharge ink droplets, through the ink discharge ports 4, that are deposited on a material used as a recording medium.

A manufacturing method for the ink jet recording head substrate of this embodiment will now be described in detail while referring to FIGS. 2A to 2E.

FIGS. 2A to 2E are schematic cross-sectional views, taken along line A-A' in FIG. 1, of the basic ink supply port forming processing performed for the ink jet recording head of this invention.

Figure 2A:
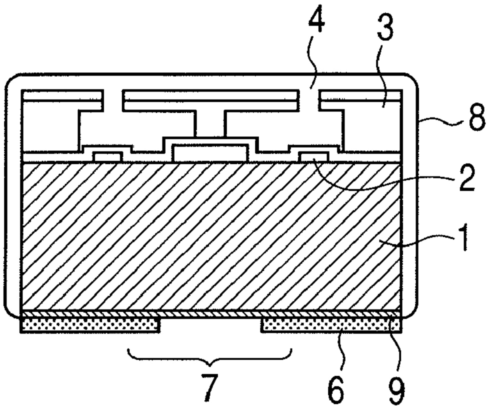
FIGS. 2A, 2B, 2C, 2D and 2E are schematic cross-sectional views of an example method for manufacturing an ink jet recording head substrate according to the present invention.

The silicon substrate 1 in FIG. 2A is a semiconductor substrate whereon the discharge energy generation elements 2 are mounted on the obverse face by patterning, and a polyether amide resin layer (not illustrated) is deposited as an adhesive layer. Thereafter, spin coating is employed to form on the polyether amide resin layer, to an arbitrary thickness, the flow passageway formation member 3, which is exposed and developed, using photolithography, to obtain multiple ink discharge ports 4. Furthermore, an $SiO_2$ layer 9, formed as a passivation layer on the reverse of the silicon substrate 1, is patterned to form a mask 6, in which an opening 7 is formed to prepare the ink supply port.

Figure 2B:
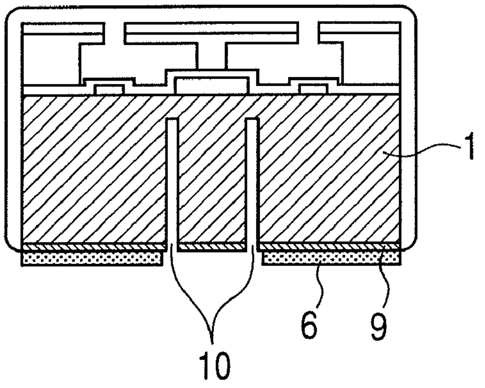
Figure 4A:
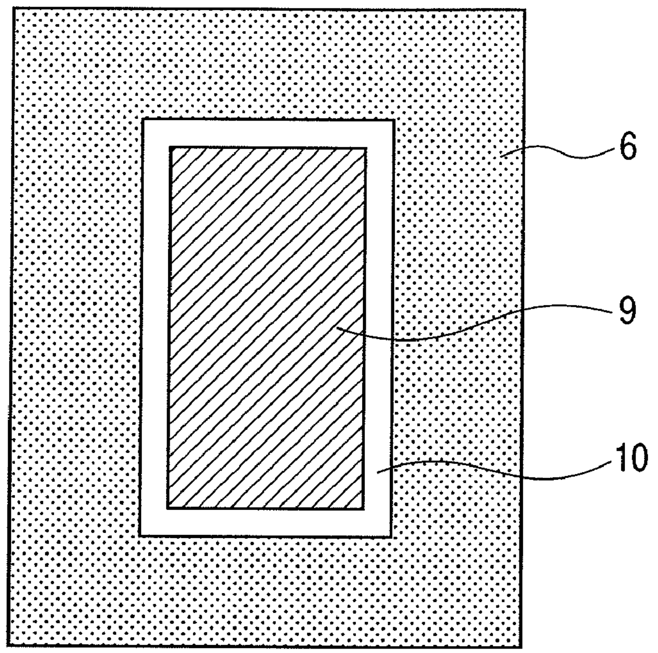
FIGS. 4A and 4B are schematic diagrams illustrating one face of a silicon substrate during the processing, performed according to the method of the present invention, for manufacturing an ink jet recording head substrate.
Figure 4B:
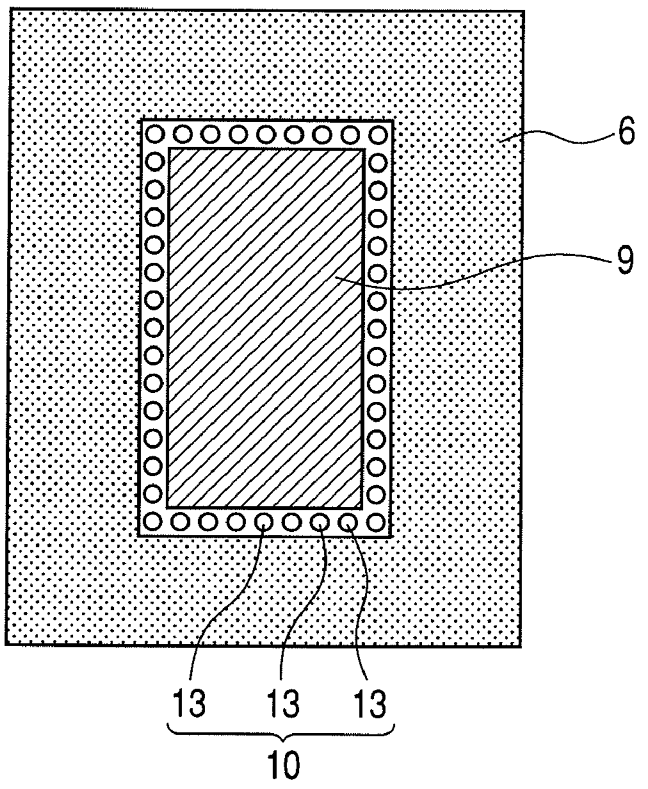

Following this, as illustrated in FIG. 2B, a groove 10 is formed along the shape of the opening 7 that is formed in the mask 6 on the reverse surface of the silicon substrate 1, i.e., along the inner edge of the mask 6 that corresponds to the edge of the opening 7. It is preferable that the groove 10 be formed on all sides of the opening 7, like a frame, as illustrated in FIGS. 4A and 4B, which are rear views of the silicon substrate 1 in the state illustrated in FIG. 2B.

The method used to form the groove 10 in this embodiment will now be described.

The inside of the opening 7 is irradiated by a laser from the reverse side of the silicon substrate 1. As a result of this laser irradiation, a recessed portion is formed in the silicon substrate 1. At this time, the recessed portion is a hole that does not pass through the silicon substrate 1, and in this invention, is also called a guide hole. Sequentially, then, the laser spot is shifted in the longitudinal direction of the ink supply port 5 to be formed, and the inside of the opening 7 is again irradiated by the laser. It should be noted that at least ½ or more of the laser spots overlap each other for the irradiation. Therefore, since the adjacent guide holes partially overlap and are contiguous, the groove 10 illustrated in FIG. 4A is formed. In this embodiment, third harmonic generation light (THG: a wavelength of 355 nm) emitted by a YAG laser is employed, and the power and the frequency of the laser light are set to appropriate values. Further, the width of the groove 10 is set to about 40 μm. As illustrated in FIG. 4B, multiple guide holes 13, which are recessed portions, may be closely arranged to form the groove 10.

For this embodiment, third harmonic generation light emitted by a YAG laser has been employed for forming the groove 10. However, the groove forming method is not limited to this method. That is, so long as the silicon used for the silicon substrate 1 can be processed to make holes, the wavelength of the laser beam used for the processing is not limited to one referred to here. For example, second harmonic generation light (SHG: a wavelength of 532 nm) emitted by a YAG laser may also be employed to form the groove 10, because relative to silicon, the SHG light, as well as the THG light, provides a high absorption rate. Furthermore, an arbitrary available method may be employed so long as a desired groove can be formed in the silicon substrate 1.

In addition, from the viewpoint of rapidly preparing an ink supply port, it is preferable that the groove 10 in the reverse face of the silicon substrate 1 be formed to a depth equivalent to half, or greater, the thickness of the silicon substrate 1.

Figure 2C:
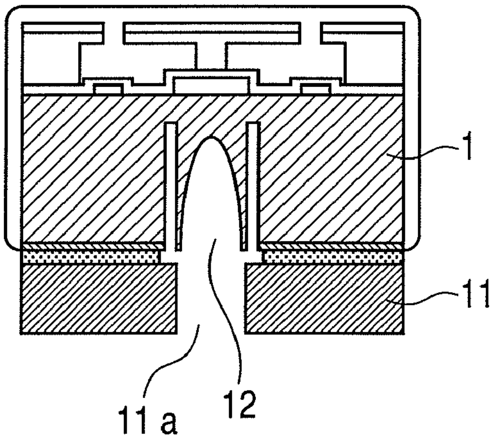

Next, referring to FIG. 2C, a masking process is performed while the mask 6 on the reverse of the silicon substrate 1 is covered by a mechanical mask 11. The mechanical mask 11 also has an opening 11*a* at the position corresponding to the opening 7 in the mask 6, but the groove 10 is hidden. That is, the opening 11*a* of the mechanical mask 11 is narrower than the opening 7 in the mask 6, and is arranged so positioned inside the groove 10. Further, it is appropriate for the mechanical mask 11 to be made, for example, of metal, because the mechanical mask 11 functions as a mask during a sandblasting process that will be described later. At this time, the mask 6 can serve as an adhesive layer to adhere the mechanical mask 11 to the $SiO_2$ layer 9.

While the silicon substrate 1 is covered by the mechanical mask 11, an abrasive is mechanically sprayed, under a high pressure, on the reverse face of the silicon substrate 1 using an available sandblasting machine, for example. This process removes the $SiO_2$ passivation film and silicon inside of the groove 10. As a result, a non-perforating, silicon-removed portion 12 is formed. At this time, the silicon-removed portion 12 should be positioned inward from the groove 10. Further, it is preferable that the distance to which silicon is removed by sandblasting be smaller than the depth of the groove 10. According to the manufacturing method of this embodiment, since silicon is mechanically removed by sandblasting, the processing period will be shorter than the period required for a manufacturing method whereby an ink supply port is formed using only anisotropic wet etching. In an alumina or SiC, for example, which is given as the abrasive used for the sandblasting, SiC is preferable due to a spherical shape. Further, a shape of a processed plane is favorable when an average grain diameter of SiC is equal to or less than 40 μm. Furthermore, it is preferable that the abrasive is sprayed or jetted to the substrate under a pressure which is equal to or larger than 0.1 MPa during the process in order to enhance a processing speed.

In this embodiment, the groove 10 is formed prior to the sandblasting process, and the silicon-removed portion 12 is formed at a position inward from the groove 10, while the distance to which silicon is removed is smaller than the depth of the groove 10. Therefore, even when a crack, for example, occurs due to the sandblasting, the presence of the groove 10 can prevent the crack from growing outside the groove 10. In addition, in this embodiment, since the opening 11*a* of the mechanical mask 11 is positioned inside the groove 10, the silicon removing process can be stably performed.

Figure 2D:
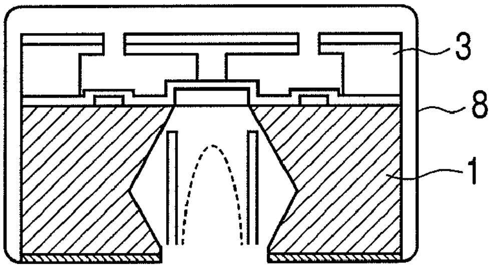

Following this, as illustrated in FIG. 2D, etching is performed from the reverse surface of the silicon substrate 1 by employing TMAH (tetra methyl ammonium hydroxide) solution as an anisotropic etchant. As a result, the ink supply port 5 is formed, and extends from the reverse of the silicon substrate 1 to the flow passageway formation member 3. In a case wherein only anisotropic wet etching is employed for the formation of the ink supply port 5, etching is to be started from the reverse side of the silicon substrate 1, and the opening size is to be determined along the {111} plane along the silicon crystal axis.

On the other hand, according to the method of this embodiment, the ink supply port 5 is formed not only by etching but also by mechanically removing silicon. Therefore, as illustrated in FIG. 2D, the opening size of the ink supply port 5 can be made smaller than that obtained using only anisotropic wet etching. Therefore, by using the manufacturing method of this embodiment, a compact ink jet recording head can be made.

Figure 2E:
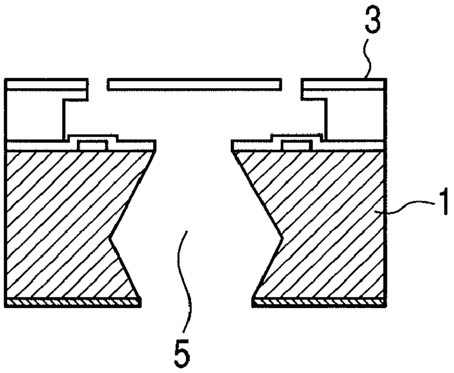
Figure 3:
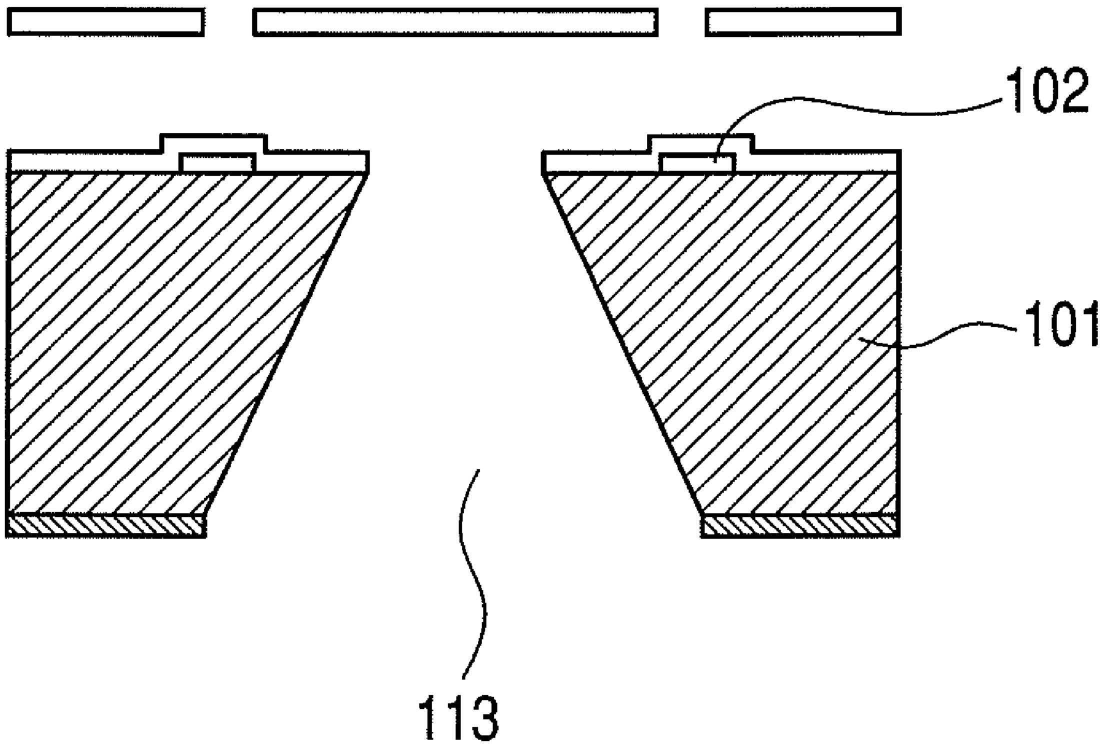
FIG. 3 is a cross-sectional view of an example conventional ink jet recording head substrate.

Finally, as illustrated in FIG. 2E, the mask 6, in which the ink supply port 5 is opened, and a protective layer 8 are removed by dry etching.

Through the above described processing, the head substrate in which the flow passageway formation member and the ink supply port are formed is completed. Many of these head substrates are cut off as chips using, for example, a dicing saw, and electric wiring for driving the discharge energy generation elements 2 are connected to the individual chips. Thereafter, chip tank members for supplying ink are also connected to the chips, and the ink jet recording heads are completed.

It should be noted that the ink supply port 5 may be formed first in the silicon substrate 1, and then the flow passageway formation member 3 may be formed. And the method employed to form the flow passageway member 3 is not especially limited to the one described herein.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-231353, filed Sep. 6, 2007, which is hereby incorporated by reference herein in its entirety.

What is claimed is:

1. A manufacturing method, for a liquid discharge head that includes a silicon substrate in which a supply port is formed for supplying a liquid, comprising the steps of:

providing the silicon substrate, a mask layer provided with an opening that corresponds to the supply port being provided on one face of the silicon substrate;

forming a groove in the silicon substrate along the shape of the opening in the mask layer;

removing silicon inward of the groove in the silicon substrate via sandblasting; and performing, from the one face, anisotropic etching of the silicon substrate that has been sandblasted, and forming the supply port.

2. The manufacturing method according to claim 1, wherein the sandblasting is performed up to a distance that is smaller than a depth of the groove.

3. The manufacturing method according to claim 1, wherein multiple recessed portions that do not pass through the silicon substrate are formed, from the reverse face, and the groove is formed by overlapping parts of the recessed portions.

4. The manufacturing method according to claim 3, wherein the recessed portions are formed using a laser.

5. The manufacturing method according to claim 1, wherein a passivation film is deposited between the one face of the silicon substrate and the mask layer, and the groove is formed through the passivation film.

6. The manufacturing method according to claim 5, wherein the passivation film is made of $SiO_2$; and wherein, for the sandblasting, a sandblasting mask used for the sandblasting and the passivation film are adhered to the mask layer.

7. The manufacturing method according to claim 6, wherein an opening in the sandblasting mask is positioned entirely inward of the opening of the mask layer.

* * * * *